United States Patent [19]
Chronister et al.

[11] Patent Number: 5,343,912
[45] Date of Patent: Sep. 6, 1994

[54] DEBARKING CHAIN QUICK CHANGE FITTING

[75] Inventors: Michael R. Chronister; Frederick J. Brindisi, both of York, Pa.; Phillip A. Schmidt, Tacoma, Wash.

[73] Assignee: Cooper Industries, Inc., Houston, Tex.

[21] Appl. No.: 72,380

[22] Filed: Jun. 7, 1993

[51] Int. Cl.⁵ .......................... B27L 1/00; F16G 13/06
[52] U.S. Cl. ........................ 144/341; 59/78; 59/85; 144/2 Z; 144/208.5
[58] Field of Search ............... 51/328; 59/78, 85; 144/2 Z, 208 R, 208 J, 341

[56] References Cited

U.S. PATENT DOCUMENTS

| | | | |
|---|---|---|---|
| 3,740 | 1/1874 | Lamb | 59/85 |
| 181,082 | 8/1876 | Levalley | |
| 841,164 | 1/1907 | Mattassi | 59/85 |
| 993,248 | 5/1911 | Hayward | |
| 1,060,744 | 5/1913 | Covert | |
| 1,411,836 | 4/1922 | Bond | |
| 1,419,112 | 6/1922 | Jones | 59/85 |
| 1,530,940 | 3/1925 | Herman | 59/85 |
| 2,260,629 | 10/1941 | McKinnon | 59/78 |
| 2,785,578 | 3/1957 | Nold | 74/245 |
| 2,831,317 | 4/1958 | Watkins | 144/208 J |
| 2,853,887 | 9/1958 | Johnson | 74/250 |
| 4,011,715 | 3/1977 | Graetz | 59/85 |
| 4,063,583 | 12/1977 | Rieger et al. | 59/85 |
| 4,172,481 | 10/1979 | Brisson | 144/208 |
| 4,222,418 | 9/1980 | McCray et al. | 144/2 Z |
| 4,640,325 | 2/1987 | Vaders | 144/208 J |
| 4,685,555 | 8/1987 | Smith | 59/85 |

FOREIGN PATENT DOCUMENTS 16953 of 1909 United Kingdom ............... 59/85

OTHER PUBLICATIONS

Danlink, Seattle Marine & Fishing Supply Co.

*Primary Examiner*—W. Donald Bray
*Attorney, Agent, or Firm*—David A. Rose

[57] ABSTRACT

The debarking chain includes a quick disconnect for attaching the debarking chain to a drum. A connecting link is releasably attached to the drum. A chain comprised of closed links is attached to the drum via the connecting link by an open link which connects the connecting link to the end closed link on the chain. The open link includes an opening for receiving a reduced cross-section of one side of the end closed link. A terminal end is formed on the open link by the opening which will prohibit the end closed link from passing over the terminal end until the end closed link is rotated such that the length of its interior aperture is aligned with the longer dimension of the terminal end of the open link. Upon such alignment, the terminal end will pass through the aperture of the end closed link to connect the chain to the drum.

35 Claims, 10 Drawing Sheets

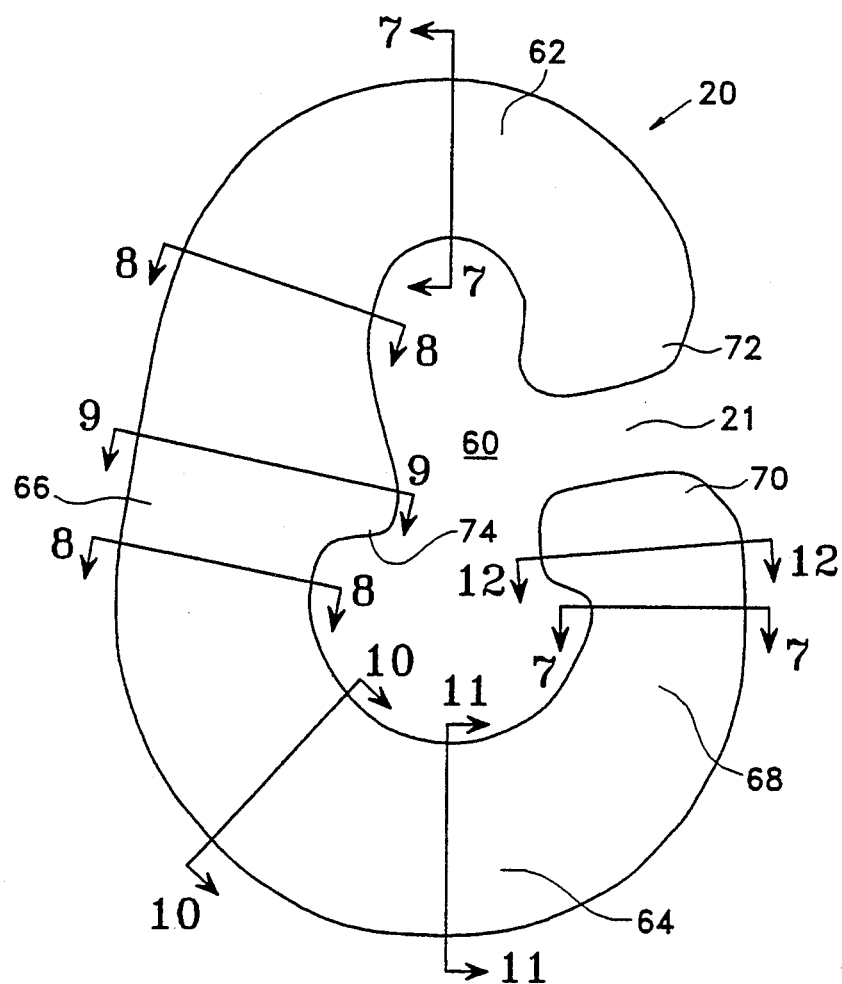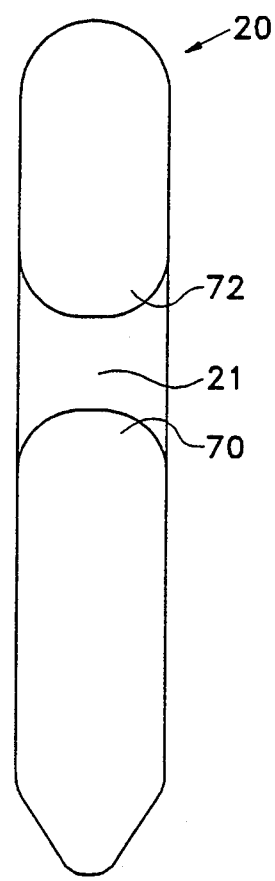
Fig. 5        Fig. 6
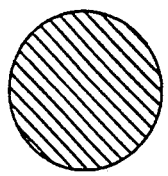 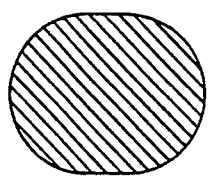 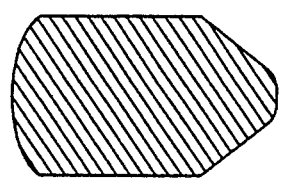
Fig. 7        Fig. 8        Fig. 9
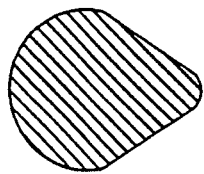 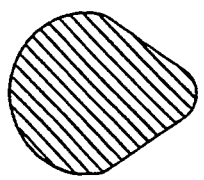 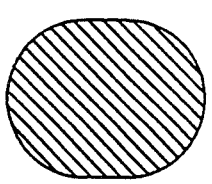
Fig. 10       Fig. 11       Fig. 12

DEBARKING CHAIN QUICK CHANGE FITTING

BACKGROUND OF THE INVENTION

This invention pertains to chains in general and in particular to chains used for removing the bark from logs by flailing or beating.

Chains attached to rotating drums or cylinders have proven to be an efficient means for removing bark from trees. These chains wear out quickly because of high stress from repeatedly striking wood and other links of the chain. The chains must be replaced frequently.

The present method of attaching the chains to the drum is to slip one link of the chain into a slot or hole in the drum and slide a rod through an opening in the drum parallel to the drum axis and through the chain link. A problem with this is that a number of chains are attached to each drum and not all of the chains may need to be replaced at the same time. Also the attachment rod itself may become deformed during use and there may be difficulty inserting the rod through the drum for reattachment of the new chain.

Changing and rearranging flail chains is labor intensive and usually requires a two man crew. A man in the flail chamber positions new and rearranged chains in the rotor holes. A second man, on the outside of the flail debarker, reinserts the attachment rods through a small opening in the drum. Communication between the two men is necessary to avoid finger injuries. A two man crew can change and rearrange chains in about 30–45 minutes.

A major drawback to this chain servicing system is that not all the chains will normally need to be changed or rearranged. Flail chains also wear at different rates depending on their position on a rotor. Usually the chains attached to the center half of the drum will wear twice as fast as the chains attached near the end. The standard chain servicing system requires the attachment rods to be pulled completely out of the rotor to service the chains at the end of the rotor. Therefore, all the chains in a row have to be handled and reinserted in the rotor holes, even though some may be in good condition.

An additional problem with the debarking apparatus presently in use is that chains must be discarded before they are worn out. A new 9 link chain may be used until it has lost an end link. The service crew may then flip it to wear the other end until it has lost two more links. The chain is then discarded because it is too short to effectively debark logs; however, it still has 5–6 good links.

SUMMARY OF THE PRESENT INVENTION

In the present invention, the chain is attached to a hook fixed to the rotating drum. A link of the chain is attached to the hook through a series of lineal, rotational, and translational movements so that the link is less likely to disengage by random movement of the chain during the debarking operation. This allows individual chains to be removed without removal of the attachment rod and all the chains on the cylinder.

BRIEF DESCRIPTION OF THE DRAWINGS

FIG. 5 shows a side view of a G-shaped link for debarking chain according to the present invention.

FIG. 6 is a front view of the G-shaped link shown in FIG. 5.

FIGS. 7–12 are sectional views of the link shown in FIG. 5.

DETAILED DESCRIPTION OF THE INVENTION

Figure 1:
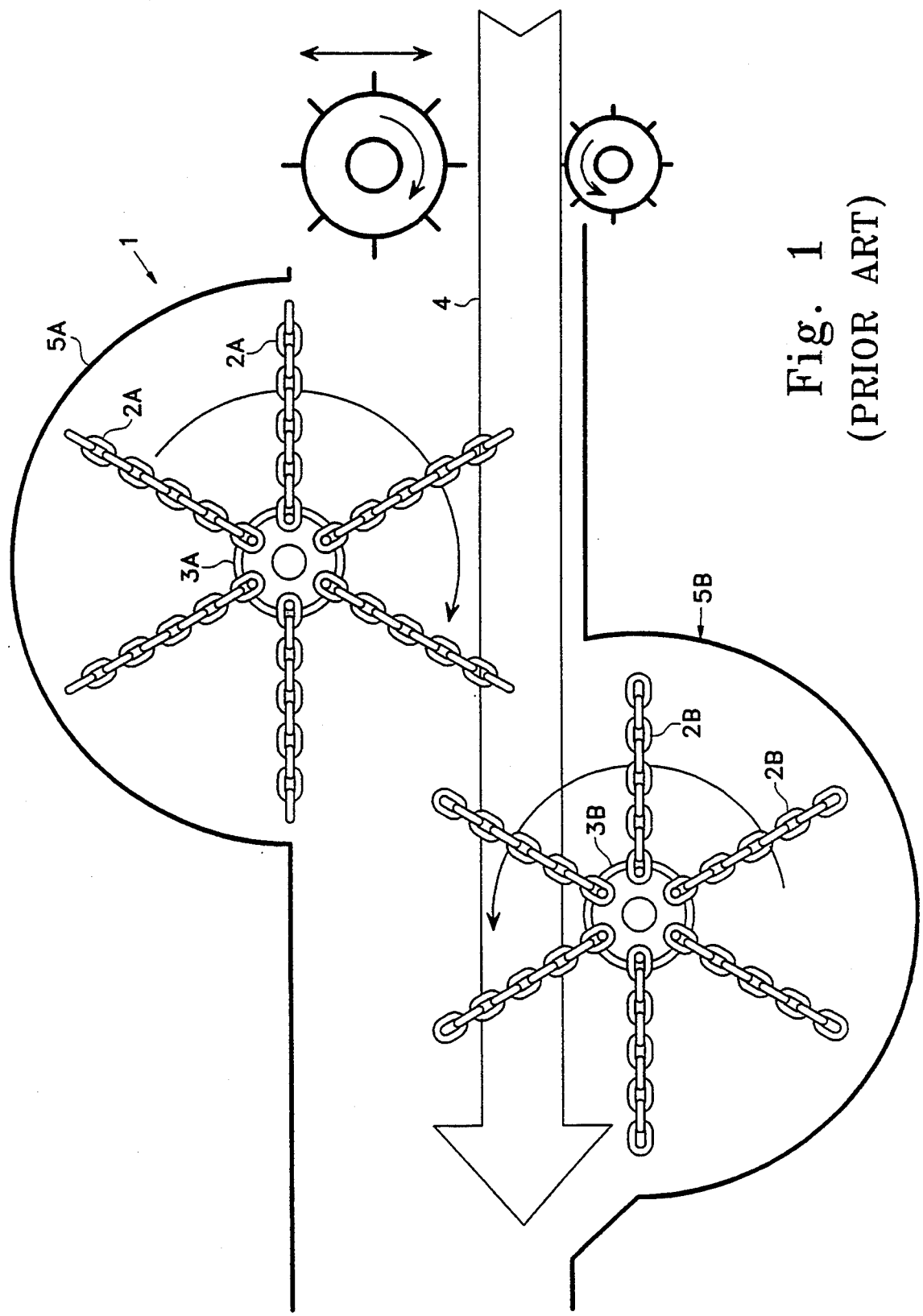
FIG. 1 shows a side view of debarking chains attached to rotating debarker drums.

The modern chain flail debarker is shown in FIG. 1. It is designated in general by numeral 1 and uses chains 2 attached to two counter-rotating drums or rotors 3 to beat the bark off of logs 4 passed lengthwise between drums 3. Flail housing 5 provides protection from broken pieces of chain and bark.

Figure 2:
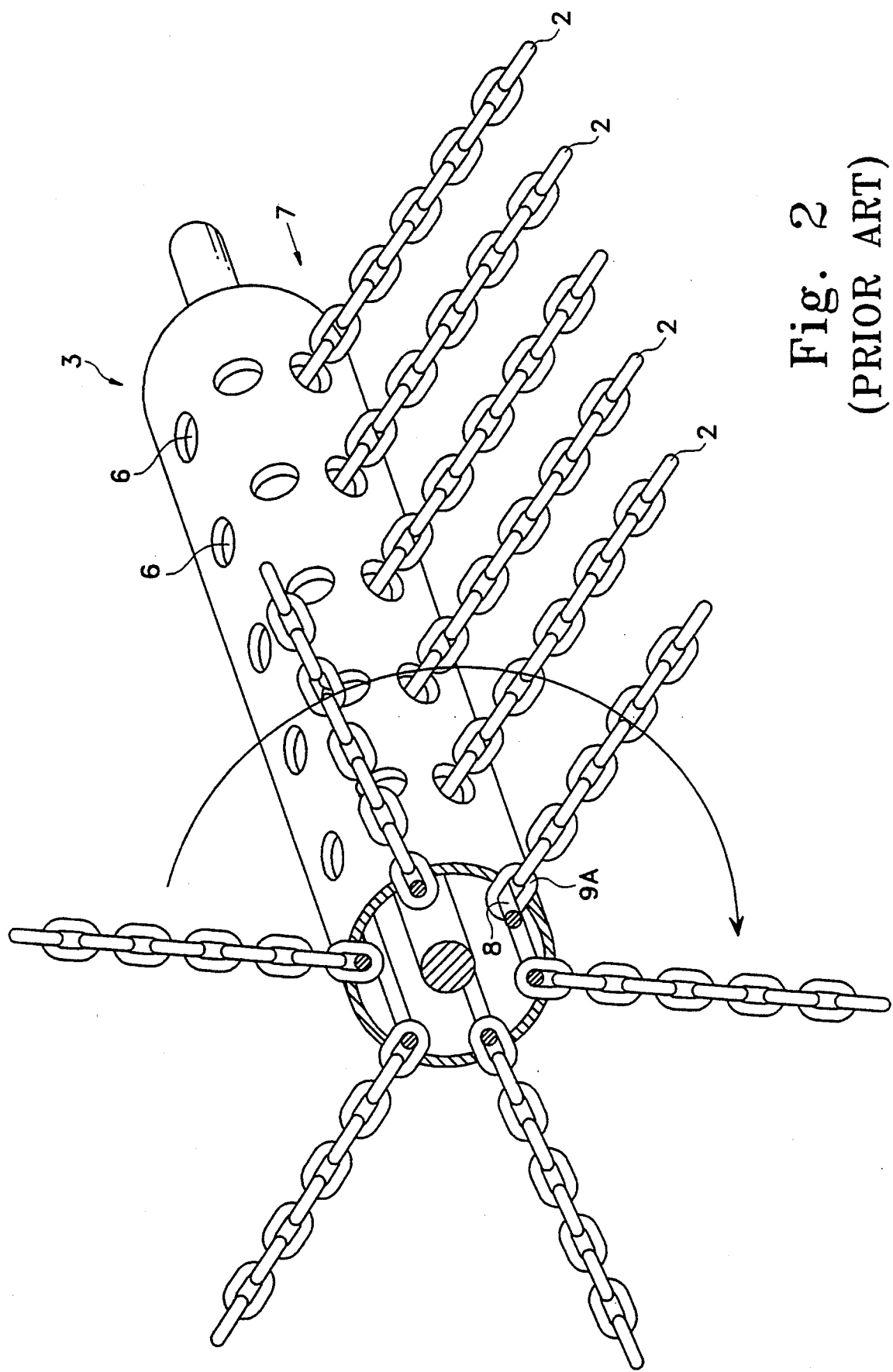
FIG. 2 shows a perspective view, partially cut away, of a debarking flail apparatus.

The drum 3 shown in more detail in FIG. 2 is usually a 10" to 12" diameter steel tube with ¾ to 1 ¼ thick walls, and is 3–4 feet in length. A drum typically has six evenly spaced rows 7 of holes 6 along its length. Each row 7 usually has seven or eights holes 6. The chains are attached by inserting one end of the chain through a hole or slot and passing a steel rod 8 through the end link of the chain. A single rod attaches all the chains in a given row on the rotor. The holes are usually large enough to allow for installation of a single or double chain to be attached side by side in a single hole.

The number of chains installed in a flail debarker will vary with flail design and debarking conditions. One design has 27 chain attachment holes on each of its two drums. Another flail design has 45 holes per drum. Tree bark is more easily removed in the spring and summer than in the fall and winter. Most flail debarkers need only a single chain per drum to debark logs in the summer while two chains per hole are needed in the winter. Some debarkers can accommodate up to 288 flail chains.

A typical flail chain 2 is a length of standard 5/8" wire diameter, grade 7, transport load binding chain, or grade 8, lifting chain. Each flail debarker design requires a specific maximum length chain. For example, one debarker used in the industry requires a 9 link flail chain that is 18 inches in overall length.

Figure 3:
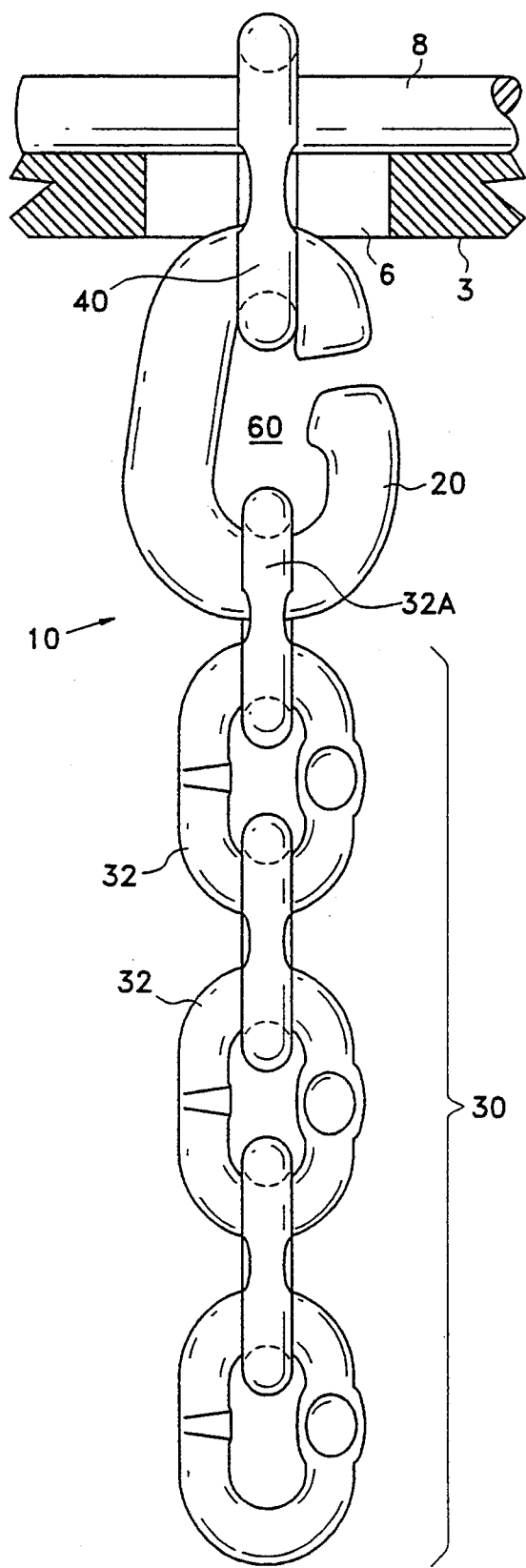
FIG. 3 is a front view of a chain according to the present invention attached to a flail drum. The drum portion is shown as a section through a rotor hole length wise along the rotor.
Figure 4:
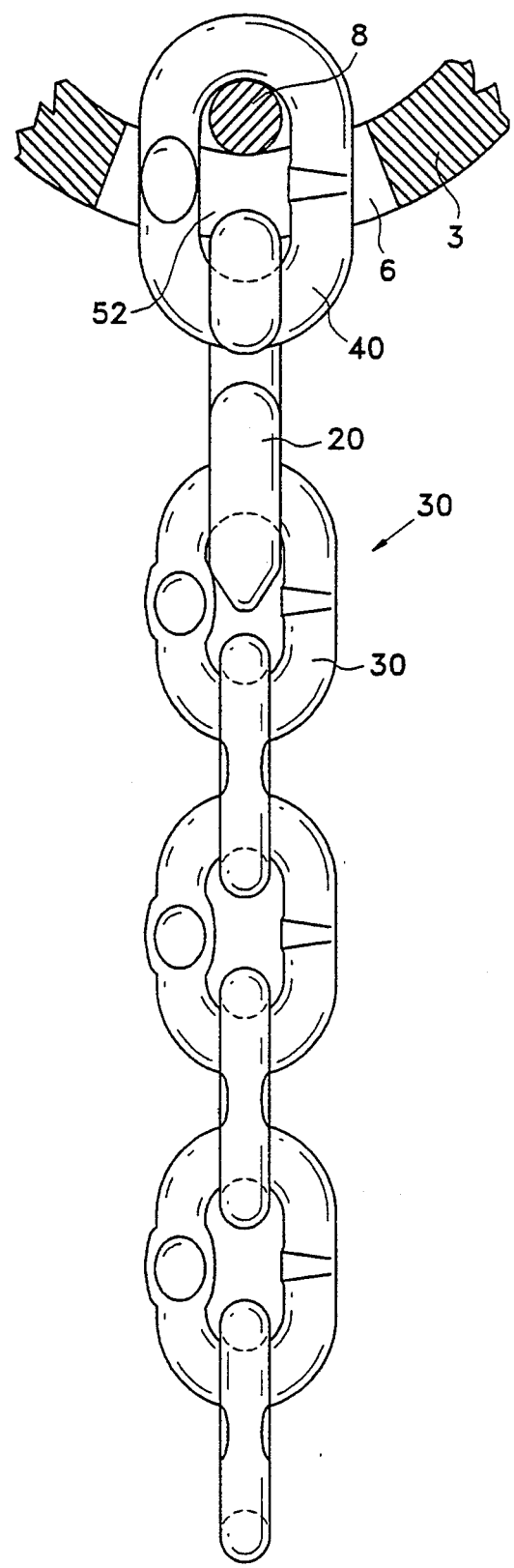
FIG. 4 is a side view of a chain according to the present invention attached to a flail drum. The attachment rod is shown as a cross section through the diameter of the drum and a rotor hole.

Referring now to FIG. 3 and FIG. 4 a debarking chain according to the present invention is referred to in general by numeral 10. The two main components of debarking chain 10 are G-shaped link 20 and closed link chain 30.

The quick change fitting, also referred to as a G-shaped link, 20 is a forged alloy steel link that is roughly in the shape of the letter G. The working chain 30 is suspended from the bottom of the G-shaped link. The G-shaped link is suspended from a base link 40 that has been inserted in hole 6 in drum 3. An attachment rod 8 has been inserted through the upper end of the interior opening of the base link 40. The base link 40 is secured by and suspends from the attachment rod 8. The interior opening of the G-shaped link 20 can accommodate one base link 40 and up to two working chains 30.

G-shaped link 20 shown in FIG. 5 and FIG. 6 may be formed of a metal by casting, machining, or forging. In the preferred embodiment G-shaped link 20 is formed by forging. The shape of various portions of G-shaped link shown in FIGS. 7–12 give the link added strength and help the G-shaped link retain the working chains. The circular section of G-shaped link, shown in FIG. 7, is important because it allows G-shaped link to rotate about connecting link 40. The substantially rectangular shape cross section of G-shape 20, shown in FIG. 12, is important for allowing closed link 32 to be specifically oriented as it is being inserted over this section. The tolerance here is close so that there is room for closed link 32 to slide over in a vertical motion, as described in more detail below, when attached to another closed link, but having no excess space so that closed link 32 may not be moved up and down by random motion.

Figure 13:
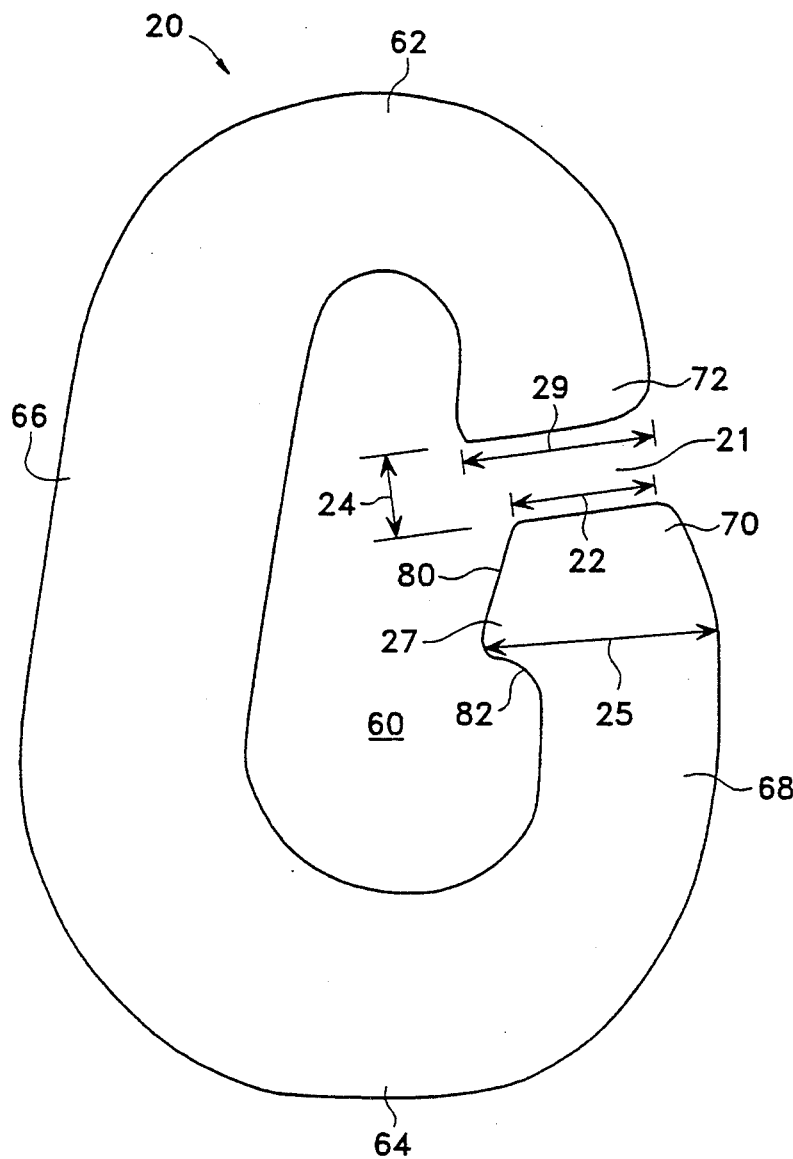
FIG. 13 is a side view of G-shaped link.
Figure 14:
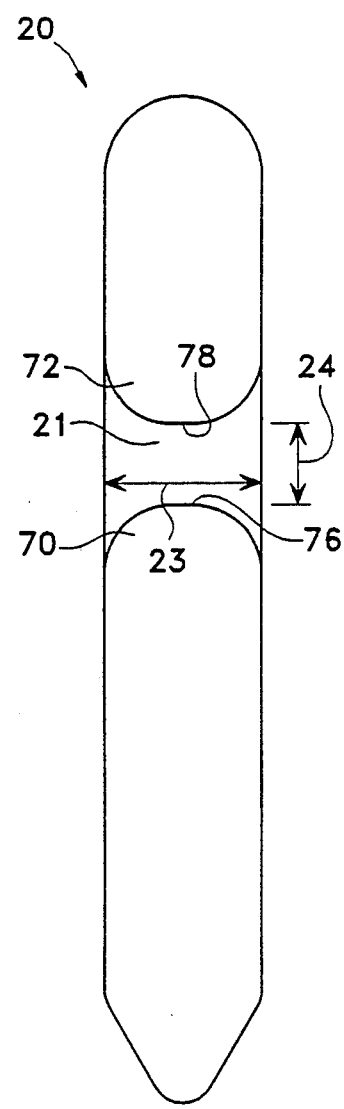
FIG. 14 is a front view of G-shaped link.

FIG. 13 is a side view and FIG. 14 is a front view of the G-shaped link. The G-shaped link 20 has a pass opening 21 that protrudes inwardly into the interior space of the fitting. The pass opening 21 has a length 22 greater than its width 23 and a height 24 that is equal to approximately 73% of the wire diameter 31 of closed link 32 of a working chain 30.

The G-shaped link 20 is shaped 24 directly below the pass opening 21 and protrudes inwardly at a smoothly increasing shape to a point about ½ inch below the bottom of the pass opening 21. At this point the length 25 of a section taken horizontally through this side of the fitting would be equal minus clearance to the pitch length 27 of the working chain minus the wire diameter 31 of the working chain. Below the point of maximum inward protrusion, the shape 24 decreases abruptly outwardly forming a stop to help keep the working chains in the bottom area of the interior space of the G-shaped link 20.

Figure 15:
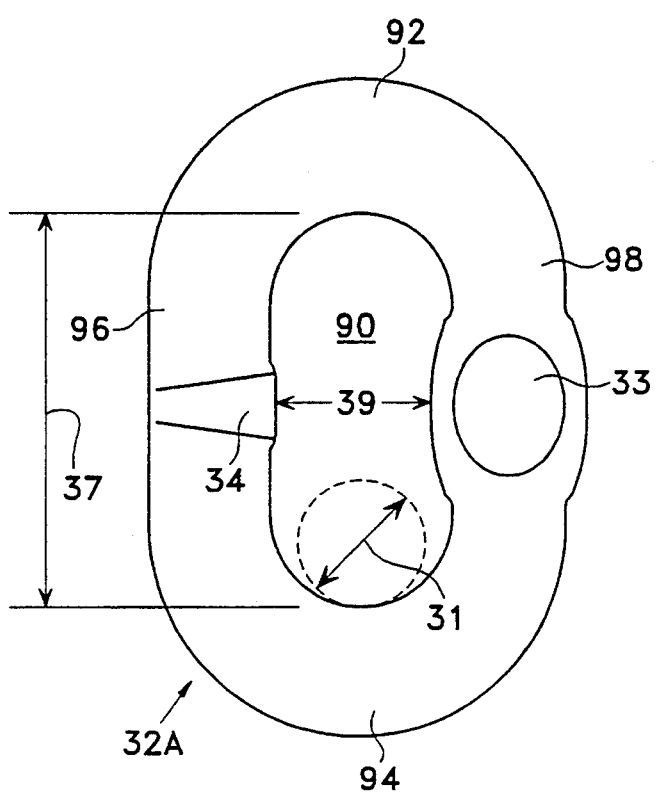
FIG. 15 shows a side view of a closed link of a debarking chain according to the present invention.
Figure 16:
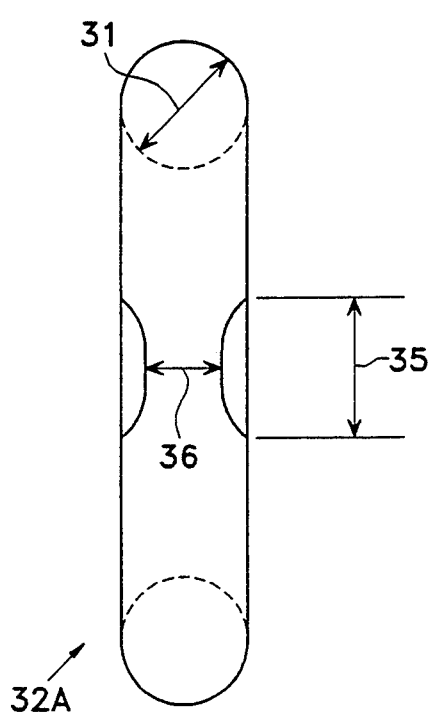
FIG. 16 shows a front view of the closed link shown in FIG. 15.

FIG. 15 is a side view and FIG. 16 is a front view of one link 32 of the working chain 30. The working chain link 32 shown in FIG. 15, FIG. 16 and FIG. 17, 17A, 17B has indentions 33 on each side of and centered in the long side of the link normally opposite the weld 34. The width 35 of the indentions 33 is greater than the width 23 of the opening 21 in the G-shaped link 20. The width 36 of the working chain link 32 between the indentions 33 is approximately 67% of the wire diameter 31.

The result of this geometry is that in order to attach the working chain link on the quick change fitting, the plane of the working chain link must be substantially aligned at right angles to both the plane and the vertical axis of the quick change fitting. In addition, the indented side of the working chain link must be centered relative to the pass opening in the quick change fitting. These steps are necessary to prevent the working chain from accidentally coming off of the quick change fitting during debarking.

Figure 17:
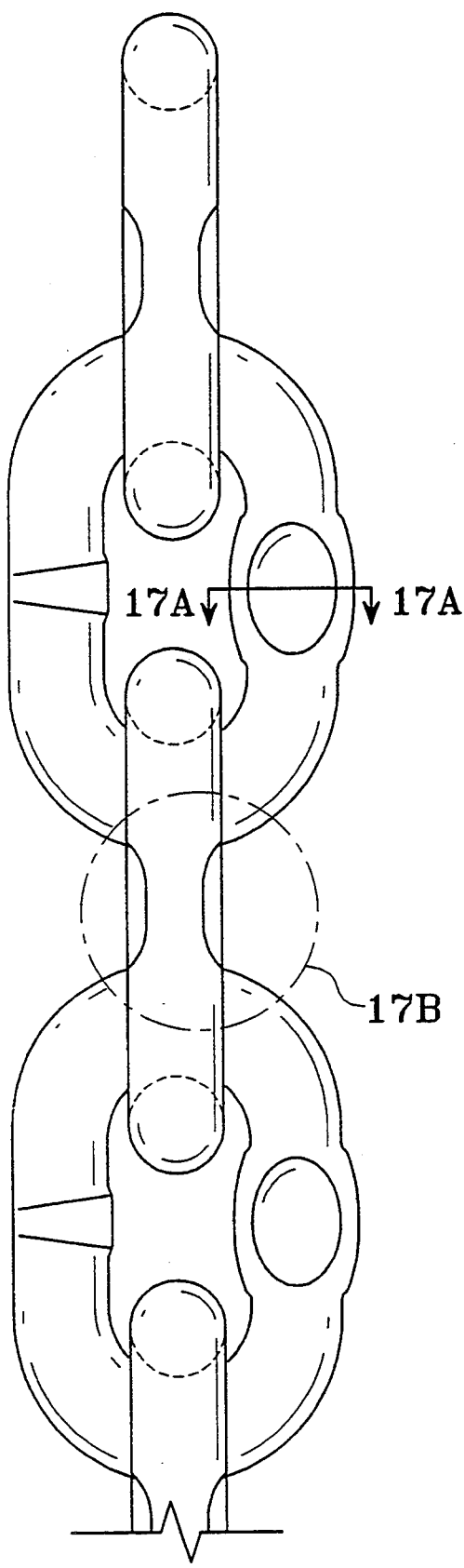
FIG. 17 shows a front view of a section of chain.
Figure 17A:
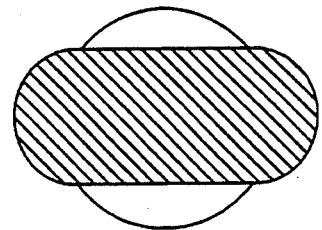
FIG. 17A shows a cross sectional view along lines AA and the debarking chain as shown in FIG. 17.
Figure 17B:
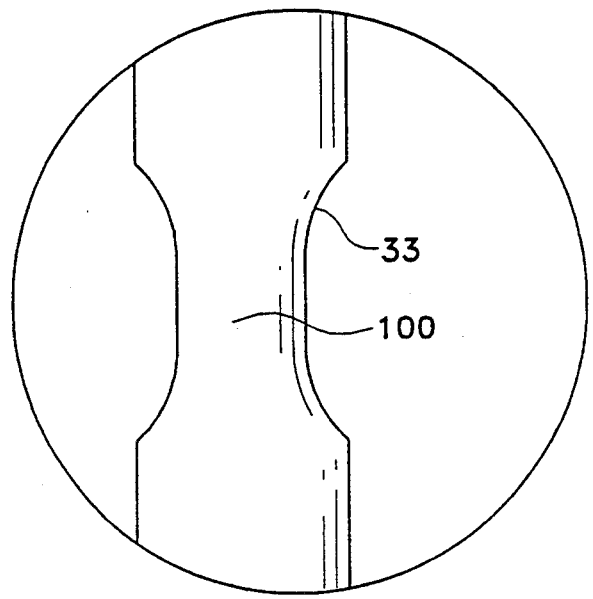
FIG. 17B shows an enlarged view along lines BB of the debarking chain as shown in FIG. 17.

Closed link 32 has a coined area 33 that is of a reduced dimension as shown in FIG. 17. This coined area 33 may be achieved by machining, but in the preferred embodiment it is coined or stamped into the metal. By coining the total cross sectional area approximates the original wire cross section. The dimension of the flatten, coined shaped area is such that it can slide through opening 21 in G-shaped link 20 with small additional tolerance. The coined area 33 and opening 21 work in cooperation so that the closed link 32 must be oriented in a plane formed by the major and minor axis of the closed link so that the plane of the closed link is approximately 90 degrees to a plane formed by the major and minor axis of the G-shaped link as shown in FIG. 18.

Figure 19:
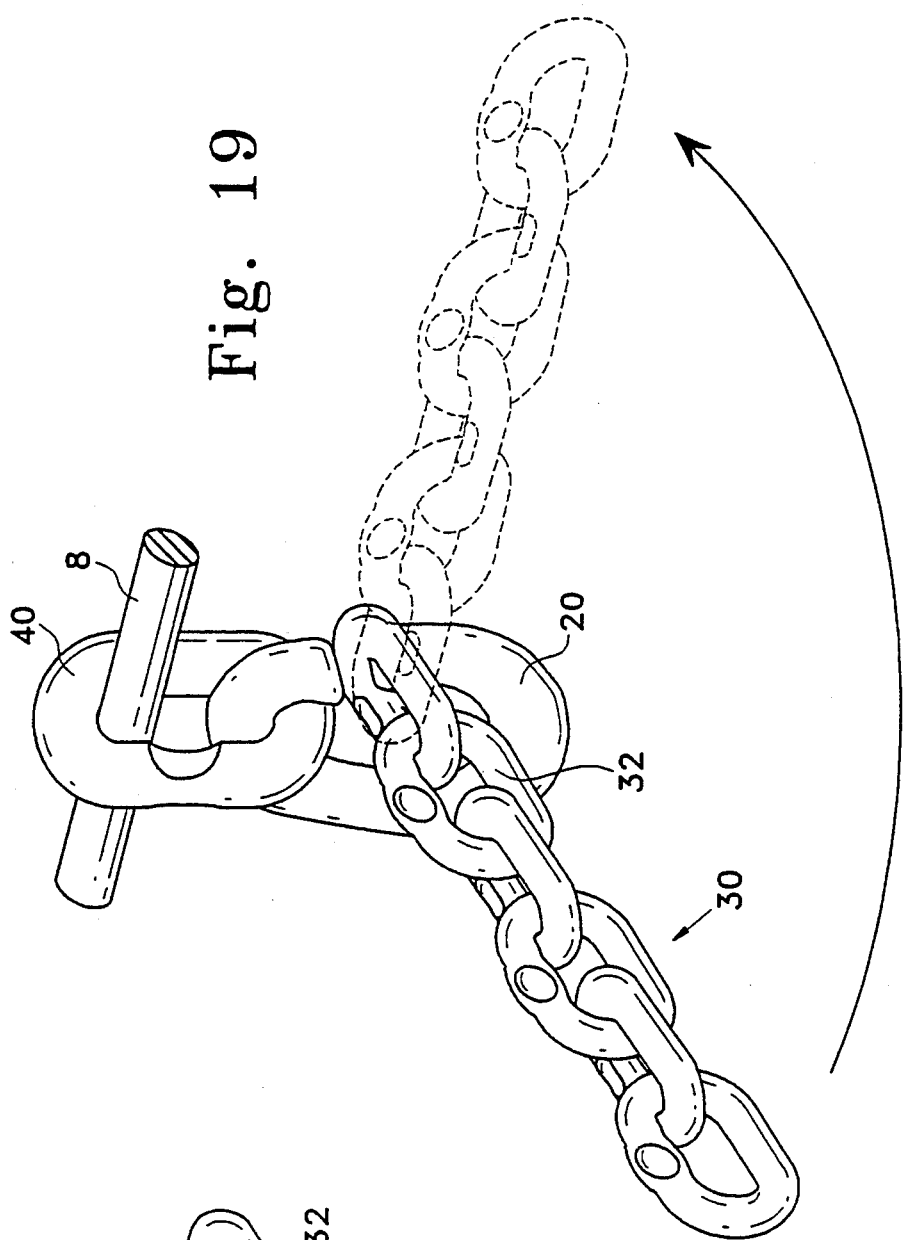
FIG. 19 shows a perspective view partially in fathom with one link of the chain inserted through the G-shaped link.
Figure 18:
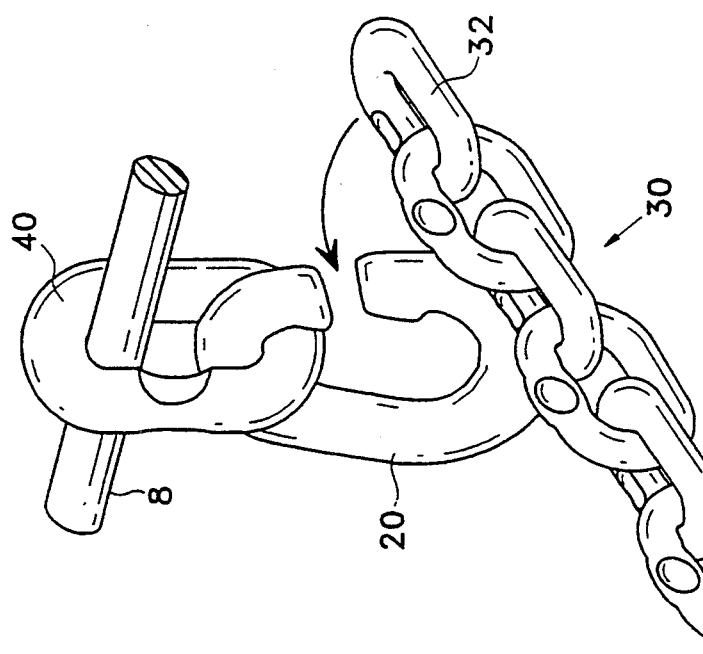
FIG. 18 shows a perspective view of a chain according to the present invention lined up ready for insertion.

Referring now to FIGS. 18–21, in operation closed link 32 is attached to G-shape link 20 by the following sequences of operations performed in order. The plane formed by the major and minor axis of the closed link is aligned 90 degrees to the plane formed by the major and minor axis in the G-shaped link as shown in FIG. 18. The closed link is then moved in a lineal fashion along its minor axis, which is approximately aligned with the minor axis of the G-shaped link as shown in FIG. 19 so that coined area 33 enters open area 21.

Figure 21:
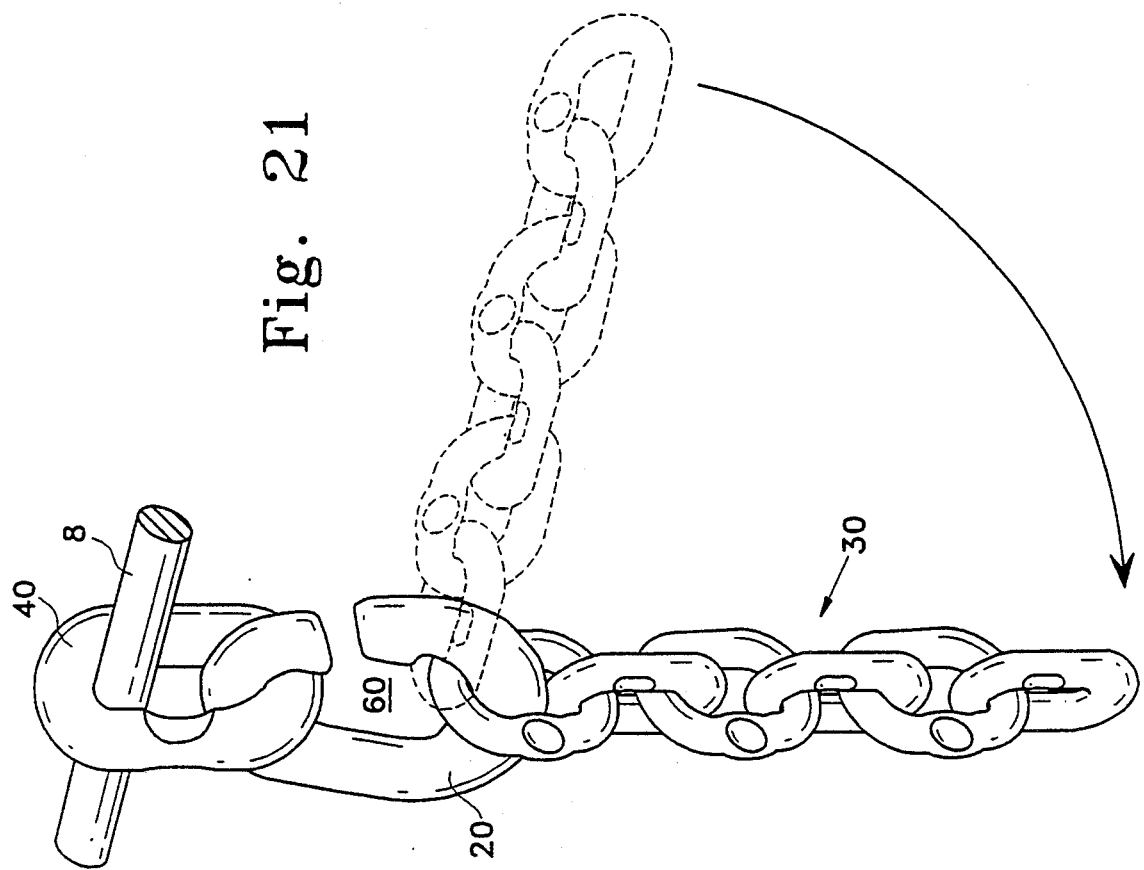
FIG. 21 shows a chain according to the present invention partially in fathom which has been rotated downward to the locking position.
Figure 20:
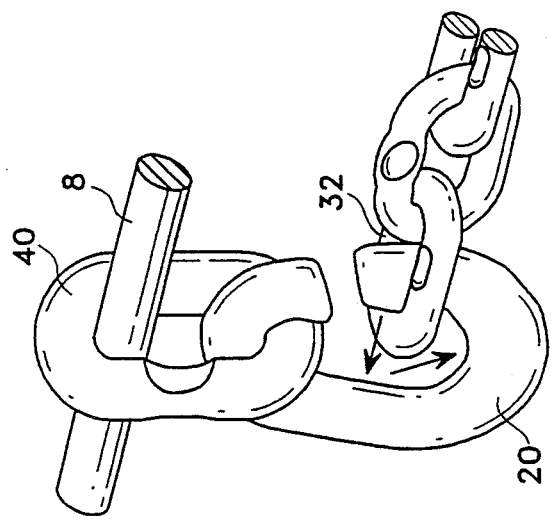
FIG. 20 shows a chain according to the present invention moved vertically downward on the G-shaped link.

The working chain 30 is rotated 90° such that its length is in the plane of the quick change fitting and perpendicular to the vertical axis of the fitting as shown in FIG. 19. In FIG. 20, the working chain 30 is moved horizontally toward the G-shaped link 20 and then downwardly to the bottom of the interior of the fitting. In FIG. 21, the working chain is rotated 90° such that its length is in the plane of the quick change and parallel to the vertical axis of the fitting.

The main intent of the design of the quick change fitting and working chain combination is to minimize the possibility that a working chain will accidentally come off during random motion of the debarking operation. When a working chain strikes a log during debarking, a random motion is imparted to the chain. These random motions occur at a rate of about 12–16 million per day in a typical flail debarker. The design of the quick change fitting and working chain combination requires that a sequence of specific motions occur for a working chain to accidentally come off a quick change fitting. These motions are:

The working chain must rotate 90° such that its length is in the plane of the quick change fitting and perpendicular to the vertical axis of the fitting;

The chain must then move in a horizontal direction toward the interior of the quick change fitting;

The chain must then move, counter to centrifugal force, upward to a position adjacent to the pass opening in the quick change fitting;

The working chain must then rotate 90° such that its length is aligned perpendicular to both the plane and the vertical axis of the quick change fitting. This rotation must also be in a direction such that, after completion, the indented side of the end link is on the inside of the quick change fitting;

The end link must move laterally relative to the plane of the fitting such that the indents in the end link align with the pass opening of the quick change fitting;

Finally, the chain must move in the plane of the fitting in a direction such that the indents in the end link pass through the opening in the quick change fitting.

Figure 22A:
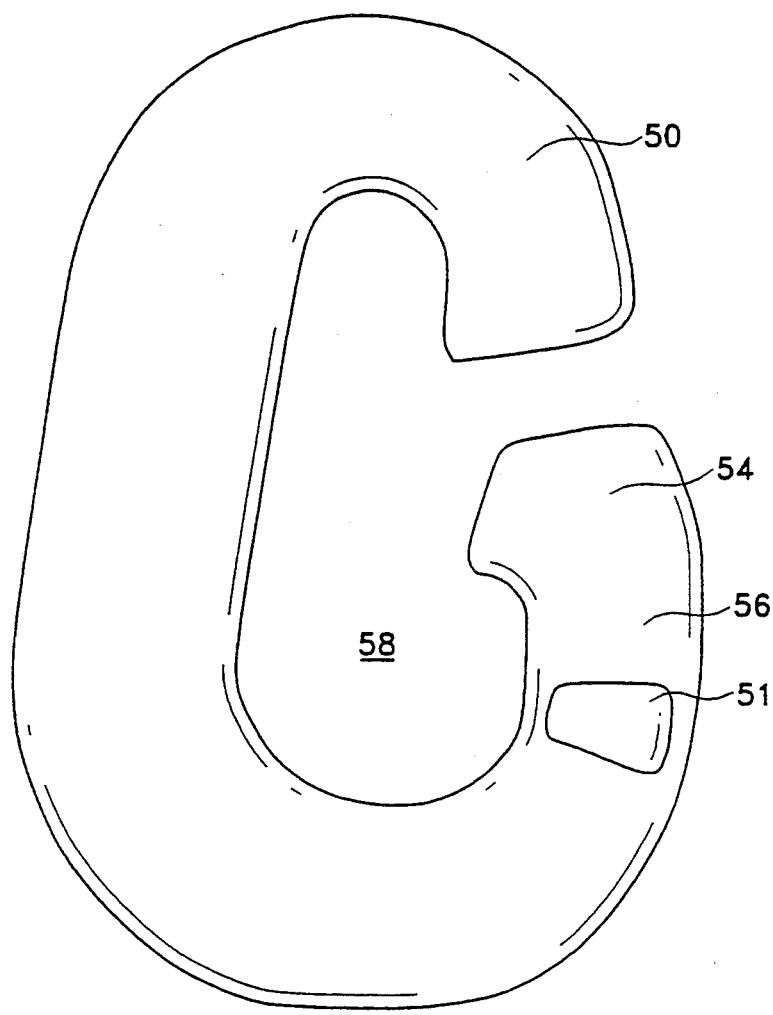
FIG. 22A and FIG. 22B show an alternate embodiment of the G-shaped link.
Figure 22B:
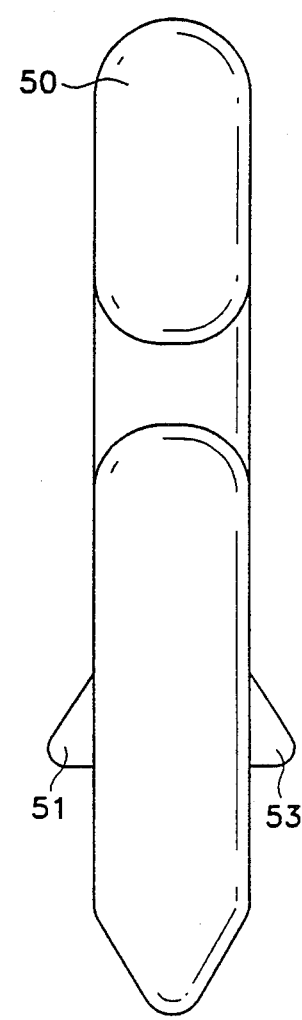

FIG. 22 shows a modified design quick change fitting 50 which has been lengthened vertically to allow for the addition of shapes 51 on the sides of the fitting. These shapes would add the following steps to the above sequence of specific motions for a working chain to accidentally come off a quick change fitting.

The working chain must then rotate 90° such that its length is aligned perpendicular to both the plane and the vertical axis of the quick change fitting;

The chain must then move counter to centrifugal force upward to a position directly above the shapes on the sides of the quick change fitting;

The working chain must then rotate 90° such that its length is in the plane of the quick change fitting and perpendicular to the vertical axis of the fitting.

We claim:

1. A debarking chain with a quick disconnect for attaching the debarking chain to a rotating member comprising:
   an open link having one side with an opening;
   a chain comprised of closed links with a first closed link having an interior aperture with a width and a length, said first closed link having a side with a reduced cross section;
   said open link opening forming a terminal end of said one side, said terminal end having a cross section with a width and a length;
   said cross section length being greater than said aperture width and smaller than said aperture length; and
   said first closed link and said open link and said open link being removably attached by a series of translational and rotational movements.

2. A debarking chain as in claim 1 wherein said reduced cross section is stamped into said first closed link.

3. A debarking chain as in claim 1 wherein said reduced cross section and said opening in said open link have a close tolerance.

4. A debarking chain as in claim 1 wherein said opening in said open link is substantially rectangular in cross section.

5. A debarking chain as in claim 1 wherein said open link includes a base which is substantially tear-drop shaped.

6. A debarking chain as in claim 1 wherein said open link includes a top which is substantially circular in cross section.

7. A debarking chain as in claim 1 wherein said open link is forged.

8. A debarking chain as in claim 1 wherein said reduced cross section includes flats on opposite surfaces of said side of said first closed link.

9. A debarking chain as in claim 1 further including a connecting link removably attached to said rotating member and said open link.

10. A debarking chain as in claim 9 wherein said connecting link includes a reduced cross section for passage through said opening.

11. A debarking chain as in claim 9 further including a rod for attaching said connecting link to the rotating member.

12. A debarking chain as in claim 1 wherein said series of translational and rotational movements includes aligning said reduced cross section with said opening, moving said reduced cross section through said opening, rotating said first closed link to align said lengths, and passing said cross section length through said aperture length to connect said chain to the rotating member.

13. A debarking chain as in claim 1 wherein said open link opening forms another terminal end of said one side, said other terminal end having a cross section with a width and a length.

14. A debarking chain as in claim 13 wherein said cross section length of said other terminal end is greater than said aperture width and smaller than said aperture length.

15. A debarking chain as in claim 13 further including a connecting link having an interior aperture with a width and a length.

16. A debarking chains as in claim 15 wherein said cross section length of said other terminal end is greater than said aperture width of said connecting link and smaller than said aperture length of said connecting link.

17. A debarking chain as in claim 1 further including at least one protruding member protruding from said one side of said open link in a direction perpendicular to said cross-section length.

18. A debarking chain as in claim 17 wherein said first closed link is rotated to align said protruding member with said aperture length for connecting said chain to the rotating member.

19. A method for connecting an open link to a closed link comprising the steps of:
   aligning a reduced cross section on one side of the closed link with an opening in one side of the open link;
   moving the reduced cross section through the opening with one end formed by the opening having a dimension preventing the one end from passing through an interior aperture of the closed link;
   rotating the closed link to align a larger dimension of the interior aperture with the dimension of the one end; and
   sliding the one end through the larger dimension of the interior aperture to connect the closed link to the open link.

20. A chain link connection comprising:
   an open link having an open interior aperture formed by a plurality of sides of said open link, one of said sides having an opening therethrough forming an end;
   a closed link having a closed interior aperture formed by a plurality of sides of said closed link, one of said sides of said closed link having a reduced dimension sized to pass through said opening;
   said closed link having a first position with respect to said open link upon passing said reduced dimension through said opening whereby said end will not pass through said closed interior aperture and a second position whereby said end will pass through said closed interior aperture to connect said closed link to said open link.

21. The connection of claim 20 wherein said end has a dimension which is larger than said closed interior aperture when said reduced dimension is passed through said opening.

22. The connection of claim 20 wherein said reduced dimension includes flats cooperating with surfaces forming said opening to restrict any movement transverse to a lineal movement of said reduced dimension through said opening.

23. A chain link connection comprising:

a first link having first and second arcuate sections and first and second straight sections forming a first plane therethrough and a first interior aperture therebetween, said first aperture having a first minor axis generally parallel to said arcuate sections and a first major axis generally parallel to said straight sections;

said first straight section having a slot therethrough forming a first end adjacent said first arcuate section and a second end adjacent said second arcuate section, said slot having a slot height determined by the minimum distance between said first and second ends, said second end having a generally rectangular cross-section with a first length extending parallel to said first plane;

a second link having third and fourth arcuate sections and third and fourth straight sections forming a second plane therethrough and a second closed interior aperture therebetween, said second closed interior aperture having a second minor axis generally parallel to said third and fourth arcuate sections and a second major axis generally parallel to said third and fourth straight sections, said second closed interior aperture having a second width along said second minor axis and a second length along said second major axis, said second width of said second closed interior aperture being smaller than said first length of said second end;

said third section having flats on each side thereof, said flats being generally parallel to said second plane and forming a reduced portion;

said reduced portion having a thickness which is in close tolerance with said slot height such that said reduced portion is prevented from movement in the direction of said first major axis as said reduced portion is passed linearly through said slot;

said second link being removably attached to said first link by rotating said second link such that said first plane is generally perpendicular to said second plane along said second major axis, centering said reduced portion with said slot, passing said reduced portion linearly through said slot with said second end preventing said second link from moving toward said second arcuate section within said interior aperture, rotating said second link to align said first length of said second end with said second length of said second aperture, and moving said second end through said second aperture for said third arcuate section to engage said second arcuate section thereby connecting said first and second links.

24. The chain link connection of claim 23 wherein said first and second ends form a slot width perpendicular to said first plane and a slot length parallel to said first plane.

25. The chain link connection of claim 24 wherein said slot length is greater than said slot width.

26. The chain link connection of claim 25 wherein said third and fourth sections having a generally circular cross-section with a diameter and said slot height equals approximately 73% of said diameter of said second link.

27. The chain link connection of claim 25 wherein said second end includes a protrusion projecting inwardly into said first interior aperture.

28. The chain link connection of claim 27 wherein said protrusion increases in cross-sectional length beginning at said slot.

29. The chain link connection of claim 28 wherein said third and fourth sections having a generally circular cross-section with a diameter and said first length of said second end, less clearance, equals said second length minus said diameter of said second link.

30. The chain link connection of claim 28 wherein said protrusion forms a stop to maintain said second link within said first interior aperture and adjacent said second arcuate section.

31. The chain link connection of claim 23 wherein said flats are centered in said third section.

32. The chain link connection of claim 23 wherein said second link is welded in said fourth section opposite said flats in said third section.

33. The chain link connection of claim 23 wherein said flats have a maximum width in the direction of said second major axis that is greater than said slot width.

34. The chain link connection of claim 23 wherein said third and fourth sections having a generally circular cross-section with a diameter and said thickness if approximately 67% of said diameter.

35. The chain link connection of claim 23 wherein the total cross-sectional area of each of said flats approximates the cross-sectional area of said second link.

* * * * *